United States Patent
Kojima

[11] 3,734,547
[45] May 22, 1973

[54] CLAMPING DEVICE BY SEGMENTAL THREAD PIPE FOR JOINT

[76] Inventor: Noriatsu Kojima, No. 31, 5-chome, Yanagishima-cho, Nakagawa-ku, Nagoya, Japan

[22] Filed: Sept. 9, 1971

[21] Appl. No.: 179,119

[52] U.S. Cl. ................................................285/357
[51] Int. Cl. ..............................................F16l 19/00
[58] Field of Search.......................285/323, 357, 387, 285/322, 226, 343, 393, 392

[56] References Cited

UNITED STATES PATENTS

| 1,538,395 | 5/1925 | Gane | 285/357 X |
| 919,913 | 4/1909 | Miller | 285/357 X |
| 1,822,887 | 9/1931 | Hagstedt | 285/357 X |
| 3,079,187 | 2/1963 | Cantor | 285/323 X |
| 2,761,702 | 9/1956 | Noel | 285/323 |
| 1,606,188 | 11/1926 | Selah | 285/323 |
| 2,457,648 | 12/1948 | Donner | 285/323 |
| 1,372,876 | 3/1921 | Freund | 285/357 |
| 1,586,725 | 6/1926 | Westinghouse et al. | 285/226 X |

*Primary Examiner*—Thomas F. Callaghan
*Attorney*—Otto John Munz

[57] ABSTRACT

A clamping device for coupling and securing firmly a pipe to be coupled to a joint is constructed in such way that one end or both ends of a joint member is provided with a clamping portion, and a tapered female thread is formed on the internal surface of the clamping portion along the opening edge, and a thread portion and a nut portion are integrally formed and said clamping member is formed in combination of two pieces as a pair so as to be assembled for use, and a tapered male thread is formed on the external surface of the thread portion so as to be screwed to the tapered female thread formed on the clamping portion of the joint member, and also the thread ridge having an identical pitch with that of the tapered male thread formed on the external surface of the thread portion is formed on the internal surface, and a vertical slit groove is notched on the thread portion, and when the thread portion of the clamping member is caused to be screwed into the clamping portion of the joint member, the pipe to be coupled is gradually and uniformly clamped and secured in spiral stripe so as to be firmly coupled, and an engaging step portion for engaging the tip of the pipe to be coupled is formed on the joint member and the clamping member is inserted to the pipe to be connected and when the clamping member is screwed into the clamping portion of the joint member, the pipe to be coupled is prevented from advancing ahead of a predetermined position in the joint member which is accompanied with the screwing of the clamping member, whereby the clamping member is provided with an assembling mechanism and this assembling mechanism prevents the discrepancy of mutual assembling positions when the two pieces of clamping members are assembled as a pair so as to obtain a complete assembly thereof.

1 Claim, 4 Drawing Figures

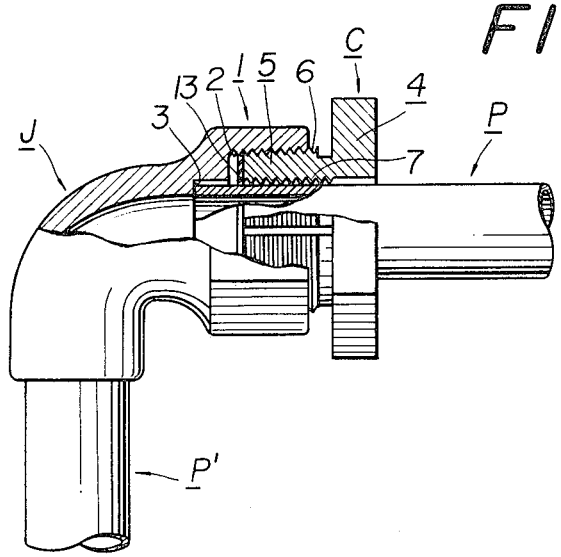
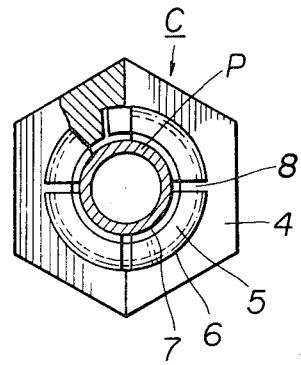
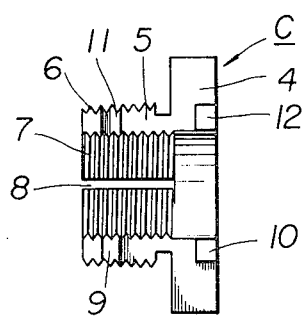
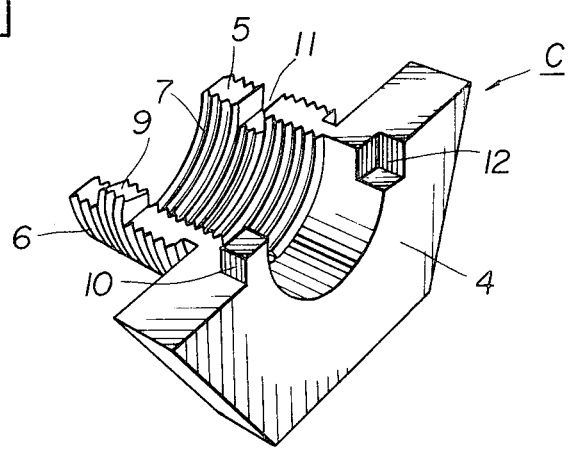
INVENTOR
NORIATSU KOJIMA

CLAMPING DEVICE BY SEGMENTAL THREAD PIPE FOR JOINT

BACKGROUND OF THE INVENTION

1. Field of the Invention

The present invention relates to a clamping device by thread pipe for joint and particularly, a nut portion and a thread portion are integrally formed and a tapered male thread is formed on the external surface of the thread portion, and also the thread ridge having an identical pitch with that of the tapered male thread is formed on the internal surface thereof, and a vertical slit groove is notched whereby a clamping member is formed, and this clamping member is formed by two pieces as one pair and is assembled on a thread pipe of segment type and a tapered groove is formed on the internal wall of the clamping portion formed at one end of the joint member and the clamping member formed by two pieces in a pair are assembled on the female thread of the clamping portion, and when the clamping member is screwed into the clamping portion of the joint member, the pipe member coupled to the joint member is firmly fixed and coupled by means of the vertical slit groove of the thread portion and the thread ridge formed on the internal surface, and furthermore an engaging mechanism is provided on the joint member so as not to cause the discrepancy of the positions of the pipe to be coupled which may be resulted from the screwing of the clamping member.

2. Description of the Prior Art

Heretofore, as clamping fixture for clamping a pipe to be coupled to the joint pipe, various types of split clamping nuts formed with vertical quardrant slits have been used, but this type of nuts not only require an increased number of parts as the conventional slit clamping nut needs to be clamped by other nut, but also the discrepancy of the coupling position of the pipe to be coupled tends to occur when the clamping operation fails, and the pipe member frequently slips off from the joint pipe, and therefore the clamping effect cannot be sufficiently expected and in addition, the connecting operation of the joint pipe and pipe member to be coupled has been difficult.

SUMMARY OF THE INVENTION

It is an object of the present invention is to provide a clamping member formed with a nut portion and a thread portion integrally, and conventional slit clamping nut needs to be clamped by other nut but in the present invention, as the clamping member is formed integrally with a nut portion and thread portion, the clamping is effected without requiring a separate nut.

It is another object of the present invention is to provide a clamping member which is formed by a threaded pipe of segmental type with two pieces as a set. The clamping member is used by combining two pieces as a set, and fitting of the clamping member can be easily carried out on the external surface of the pipe member coupled to the joint member, and therefore the pipe connecting work at a location where piping work is difficult due to the narrow location can be easily carried out.

It is a further object of the present invention is that a tapered male ridge is formed on the external surface of the thread portion of the clamping member and a corresponding tapered female thread to the tapered male thread formed on the external surface of the thread portion is formed on the internal surface of the clamping portion of the joint member so as to make the clamping member is screwable to the joint member, and furthermore a vertical slit groove is notched on the thread portion of the clamping member so as to clamp the pipe to be coupled elastically.

It is a still further object of the present invention is that a thread ridge having an identical pitch with that of a tapered male thread formed on the thread portion is formed on the internal surface of the thread portion of the clamping member and the thread ridge on the internal surface is arranged to increase the clamping force gradually and smoothly as the thread is uniform and spiral form with respect to the pipe to be coupled and being coincided with the clamping force by the vertical slit groove and the tapered male thread formed on the external surface and therefore slipping off can be prevented.

A more specific object of the present invention is that an engaging mechanism is provided on the joint member and a tip of the pipe to be coupled is abutted against the engaging mechanism and when the clamping member is screwed into the clamping portion of the joint member, the advancement of the pipe to be coupled in the thread direction which is caused by the screwing of the clamping member is prevented, and when the clamping operation is effected, the discrepancy of the position of the pipe to be coupled with respect to the joint is prevented, and troublesome work of adjusting the clamping operation as experienced conventionally can be eliminated whereby the work efficiency is remarkably improved.

A particular object of the present invention is to provide a clamping member provided with an assembling mechanism and the discrepancy of the position when two pieces of the clamping member is assembled as a set can be prevented and the assembling work of the clamping member can be easily carried out.

BRIEF DESCRIPTION OF THE DRAWING

FIG. 1 is a partly cut-out explanation drawing showing the condition where a pipe member is coupled to one end of a joint member and the pipe member is firmly coupled to the joint member, FIG. 2 is a perspective view of the clamping member, FIG. 3 is plan view of the clamping member, and FIG. 4 is an explanation drawing showing the condition where two pieces of clamping members are assembled so as to be installed on the pipe body.

DETAILED DESCRIPTION OF THE INVENTION

Briefly, an apparatus of the present invention is formed by assembling two pieces of clamping members as a set which are indicated by letter C, and the assembled clamping member is screwed into one end of a joint member J and the connection to a clamping member to the pipe member P is firmly clamped and secured.

The joint member J is provided with a clamping portion 1 by forming a cylindrical body which is larger than the joint member J in diameter on one end thereof and a tapered female thread 2 is formed on the internal wall of the clamping portion 1 from the edge of the opening, and an engaging step portion 3 is provided at a location slightly remote from the tip of this female thread 2 and the tip of the pipe member P which is inserted and coupled to the joint member J is engaged with the step portion so as to prevent the advancement of the pipe member P together with the clamping member C beyond a desired position in the joint member J and thus the pipe member P is secured in the joint member.

As shown in FIG. 1, the joint member J is bent in its middle portion and a pipe P' is fitted to its other end, but the joint member J may be formed linearly, and also it is preferable to provide clamping portions at both ends of the joint member J and the pipe member P are fitted to said both ends of clamping portions.

The clamping member C is provided with a nut portion 4 and a thread portion 5 integrally, and the nut portion 4 is formed in such a way that an ordinary nut is cut in half, and the thread portion 5 is formed in semi-cylindrical form.

On the external surface of the thread portion 5, a tapered male thread 6 is formed in order that the thread portion 5 is screwed to the tapered female thread 2 formed on the clamping portion 1 of the joint member J, and also, a thread ridge 7 having a pitch identical with that of said tapered male thread 6 is formed on the internal surface of the thread portion 5 in order to engage the external peripheral surface of the pipe member P, and a groove portion 8 of vertical slit is notched on the thread portion 5 in the longitudinal direction of the thread portion as shown in FIG. 3 to provide the elastic function to the thread portion 5. When the pipe member P is connected to the joint member J, the vertical slit groove portion 8 formed on the thread portion 5 is squeezed by the screwing of the clamping member C to the clamping portion of the joint member J, and simultaneously, the thread ridge 7 of the internal surface of the thread portion 5 is engaged with the external peripheral surface of the pipe member P with a pitch identical with the thread pitch of the thread portion 5, and it is elastically engaged and fixed and coupled by the squeezing action of the groove portion 8. As shown in FIG. 2, projections 9, 10 are protruded on one edge side of the thread portion 5 and the edge of one side of the nut portion 4, and depressed portions 11, 12 which correspond and fit to the projections 9, 10 formed at the edge of the respective opposite sides, whereby a segmental thread pipe is formed by assembling two pieces of the clamping members as a set as illustrated in FIG. 1.

Now, as shown in FIG. 1, the pipe member P fitted with a packing 13 is inserted into the joint member 1 and is abutted against the engaging step portion 3, and two pieces of the clamping member C as one set are assembled on the external periphery of the pipe member P and the clamping member C is screwed to the tapered female thread 2 of the clamping member so that the packing 13 is compressed and the joint member J and pipe member P become intimately in contact and coupled and secured.

Furthermore, when the clamping member C is screwed, the vertical slit groove portion 8 is clamped and the thread ridge 7 formed on the internal surface of the thread portion 5 of the clamping member C is engaged with the external peripheral surface of the pipe member P so as to be elastically engaged and fixed and coupled.

As compared with the conventional clamping fixture which uses slit clamping nut as lock nut for locking the looseness of the clamping nut, the clamping member C according to the present invention in which the thread portion 5 and nut portion 4 are integrally formed sufficiently serves the purpose, and this clamping member C saves the number of parts to be required and as the clamping member C is formed so as to be assembled from two pieces into one set on the external periphery of the pipe member P, the piping work in the narrow location can be easily carried out and also as the tapered male thread 6 formed on the external surface in the thread portion 5 of the clamping member C and the thread ridge 7 formed on the internal surface thereof are formed spirally with an identical pitch, and the thread ridge 7 formed on the internal surface of the thread portion 5 is of spiral and uniform by being coincided with the clamping force of the tapered male thread 6 formed on the external surface can smoothly increase the clamping force gradually on the external periphery of the pipe member P abutted and fitted on the engaging step portion of the joint member J. There are many effects such as that as the pipe member P is abutted and supported on the engaging step portion 3, troublesome work of adjusting the coupling position by regulating the clamping operation which is required as the clamping member C is screwed into the joint member J, and the work efficiency can be remarkably improved. The clamping member C causes no discrepancy of position at the time of assembling with the uses of the projections 9, 10 and depressed portions 11, 12 which correspond to each other, and thus the operation becomes simple and easy and also it has a simple structure with minimum number of parts, the production cost of the clamping member can be set to a low level and yet can be constructed in compact form.

Although the invention is described with reference to a preferred embodiment, it will be appreciated by those skilled in the art that additions, deletions, modifications and substitutions and other changes not specifically described and illustrated in this embodiment may be made which will fall within the purview of the appended claims.

What is claimed is:

1. A clamping device for the end of a hollow pipe comprising in combination:

a hollow joint member having a cylindrical clamping end portion with an enlarged cross-sectional area, said enlarged area having a first internal stepped portion with female-type threads tapering inwardly from the outer end of said joint member, said first stepped portion defining an annular spacing between said joint member and said pipe, said enlarged area having a second internal stepped portion located and arranged more remote from the outer end of said joint member than said first stepped portion, a first radially extending shoulder joining said first and second step portions, a second radially extending shoulder at the inner end of said second step portion and adapted to abut the end of said pipe;

a hollow cylindrical clamping assembly having a nut portion means and a thread portion means, said thread portion means being positioned within said annular spacing, said nut and thread portion means being structurally arranged as two semi-cylindrical portions provided with longitudinal slits diametrically opposite one another and together forming the split hollow cylindrical clamping assembly, said longitudinal slits extending the full length of said thread portion means, a pair of outwardly projecting means being formed on the longitudinal split edges of each of said semi-cylindrical portions, one projecting means positioned intermediate said thread portions means, and the other projecting means positioned at the outer end of said nut portion means, and corresponding recess means being formed on said thread and nut portion means for respectively receiving said projecting means therein to secure said semi-cylindrical portion firmly together, said thread portion means having external male-type threads tapering away from the outer end of said clamping assembly and being operatively engaging said female-type threads of said first stepped portion, said thread portion means having internal threads of the same pitch as said external male-type threads of said thread portion means, said internal threads of said thread portion means being adapted to engage said pipe; and an annular packing member positioned within said annular spacing adjacent the inner end of said thread portion means of said clamping assembly and engaging said first shoulder, the penetration of said thread portion means into said annular spacing urging said packing member into a fluid tight relationship between said joint member and the surface of the pipe.

* * * * *